United States Patent
Chen et al.

(10) Patent No.: US 10,995,688 B2
(45) Date of Patent: May 4, 2021

(54) METHOD AND SYSTEM FOR DETERMINING THERMAL STATE

(71) Applicant: GM GLOBAL TECHNOLOGY OPERATIONS LLC, Detroit, MI (US)

(72) Inventors: Jun Chen, Novi, MI (US); David E. Edwards, Rochester Hills, MI (US); Yiran Hu, Shelby Township, MI (US); Min Sun, Troy, MI (US); Adam J. Heinzen, Farmington Hills, MI (US); Michael A. Smith, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 37 days.

(21) Appl. No.: 16/431,199

(22) Filed: Jun. 4, 2019

(65) Prior Publication Data
US 2020/0386179 A1    Dec. 10, 2020

(51) Int. Cl.
*F02D 41/14*    (2006.01)
*G01K 13/02*    (2021.01)
(Continued)

(52) U.S. Cl.
CPC .............. *F02D 41/14* (2013.01); *F01P 7/167* (2013.01); *F02D 43/04* (2013.01); *G01F 7/00* (2013.01); *G01K 13/02* (2013.01); *F02D 2041/1417* (2013.01); *F02D 2200/022* (2013.01); *G01K 13/026* (2021.01)

(58) Field of Classification Search
CPC ............. F02D 41/14; F02D 2009/0223; F02D 2041/1417; F02D 2200/021; F02D 2200/022; F01P 7/167; G01K 13/02; G01K 2013/026
See application file for complete search history.

(56) References Cited

U.S. PATENT DOCUMENTS

| | | | | |
|---|---|---|---|---|
| 5,094,213 A | * | 3/1992 | Dudek | F02D 37/00 |
| | | | | 123/339.27 |
| 5,270,935 A | * | 12/1993 | Dudek | F02D 41/1401 |
| | | | | 123/480 |

(Continued)

FOREIGN PATENT DOCUMENTS

| | | | | |
|---|---|---|---|---|
| DE | 3146374 A1 | * | 5/1983 | ............ G01P 13/006 |
| DE | 102006042874 A1 | * | 3/2008 | ............ G01K 13/02 |
| DE | 102013203175 A1 | * | 8/2013 | ............ F01N 11/002 |

OTHER PUBLICATIONS

Welch, G., et al., "An Introduction to the Kalman Filter", 2001, ACM SIGGRAPH.*

(Continued)

*Primary Examiner* — John M Zaleskas
(74) *Attorney, Agent, or Firm* — Lorenz & Kopf LLP

(57) ABSTRACT

Systems and methods are provided for determining a temperature of a thermal system that includes fluid conduits. A sensor monitors a current state of the temperature. A controller receives a signal from the sensor that is representative of the current state; determines a flow in the fluid conduits; determines a noise covariance of the thermal system; processes a thermal model of the thermal system; predicts a next-step state of the parameter at a time after the current state; and corrects the next-step state based, at least in-part, on the noise covariance resulting in a corrected next-step state.

20 Claims, 5 Drawing Sheets

(51) Int. Cl.
    G01F 7/00       (2006.01)
    F02D 43/04      (2006.01)
    F01P 7/16       (2006.01)

(56) References Cited

U.S. PATENT DOCUMENTS

| | | | | |
|---|---|---|---|---|
| 5,273,019 | A * | 12/1993 | Matthews | F02D 41/1401 |
| | | | | 123/406.48 |
| 5,931,140 | A | 8/1999 | Maloney | |
| 6,357,429 | B1 * | 3/2002 | Carnevale | F02D 41/008 |
| | | | | 123/673 |
| 6,712,133 | B1 * | 3/2004 | Kyrtsos | B60H 1/00735 |
| | | | | 165/239 |
| 7,131,403 | B1 * | 11/2006 | Banga | F02B 29/0443 |
| | | | | 123/41.31 |
| 7,921,705 | B2 | 4/2011 | Hamama et al. | |
| 8,482,237 | B2 | 7/2013 | Berry et al. | |
| 8,857,157 | B2 | 10/2014 | Hamama et al. | |
| 10,087,815 | B2 | 10/2018 | Naik et al. | |
| 10,190,478 | B1 | 1/2019 | Giraudo | |
| 2002/0016656 | A1 * | 2/2002 | Chung | F01P 7/048 |
| | | | | 701/36 |
| 2003/0178016 | A1 * | 9/2003 | Nebiyeloul-Kifle | |
| | | | | F02D 41/1496 |
| | | | | 123/676 |
| 2005/0057255 | A1 * | 3/2005 | Tate, Jr. | G01R 31/3842 |
| | | | | 324/426 |
| 2005/0267669 | A1 * | 12/2005 | Wang | F02D 41/1456 |
| | | | | 701/102 |
| 2006/0209921 | A1 * | 9/2006 | Brown | G01K 3/00 |
| | | | | 374/109 |
| 2007/0101977 | A1 * | 5/2007 | Stewart | F02D 41/0007 |
| | | | | 123/679 |
| 2007/0256407 | A1 * | 11/2007 | Reuter | F01N 3/208 |
| | | | | 60/286 |
| 2008/0312806 | A1 * | 12/2008 | Ueda | F02P 5/151 |
| | | | | 701/103 |
| 2009/0024300 | A1 * | 1/2009 | Turin | F02D 41/18 |
| | | | | 701/103 |
| 2010/0083936 | A1 * | 4/2010 | Verdejo | F02D 41/009 |
| | | | | 123/406.65 |
| 2010/0089041 | A1 * | 4/2010 | Tai | F02D 41/029 |
| | | | | 60/287 |
| 2012/0053800 | A1 * | 3/2012 | Kieliszewski | F16H 59/72 |
| | | | | 701/60 |
| 2012/0303245 | A1 * | 11/2012 | Wang | F02D 41/0025 |
| | | | | 701/104 |
| 2014/0072450 | A1 * | 3/2014 | Levijoki | F01P 5/14 |
| | | | | 417/42 |
| 2014/0074381 | A1 * | 3/2014 | Sczomak | F02D 35/026 |
| | | | | 701/105 |
| 2014/0283764 | A1 * | 9/2014 | Abou-Nasr | F01P 7/167 |
| | | | | 123/41.02 |
| 2015/0059690 | A1 * | 3/2015 | Svensson | F02D 41/38 |
| | | | | 123/344 |
| 2015/0248375 | A1 * | 9/2015 | Houel | G06F 17/18 |
| | | | | 702/189 |
| 2015/0377170 | A1 * | 12/2015 | Chen | F02D 41/047 |
| | | | | 123/478 |
| 2016/0053701 | A1 * | 2/2016 | Iwase | G01M 15/11 |
| | | | | 123/673 |
| 2016/0079633 | A1 * | 3/2016 | Wahlstrom | H01M 10/60 |
| | | | | 429/83 |
| 2016/0237927 | A1 * | 8/2016 | Long | F02D 41/1406 |
| 2016/0237932 | A1 * | 8/2016 | Long | F02D 41/0007 |
| 2016/0334807 | A1 * | 11/2016 | Song | G06F 17/16 |
| 2016/0356515 | A1 * | 12/2016 | Carter | G05B 13/048 |
| 2017/0002720 | A1 * | 1/2017 | Naik | F04B 49/02 |
| 2017/0002721 | A1 * | 1/2017 | Naik | F04B 49/02 |
| 2017/0030216 | A1 * | 2/2017 | Furukawa | F02C 7/00 |
| 2017/0306871 | A1 * | 10/2017 | Fuxman | F02D 41/26 |
| 2017/0328296 | A1 * | 11/2017 | Kamio | F02D 41/047 |
| 2018/0073418 | A1 * | 3/2018 | Bonkoski | F01P 5/10 |
| 2018/0363580 | A1 * | 12/2018 | Jin | F02D 41/0007 |
| 2019/0032538 | A1 * | 1/2019 | Giraudo | F01P 3/20 |
| 2019/0040815 | A1 * | 2/2019 | Nishida | F02F 1/40 |

OTHER PUBLICATIONS

Kalman, R.E., "A New Approach to Linear Filtering and Prediction Problems", 1960, Transactions of the ASME—Journal of Basic Engineering, 82 (Series D), pp. 35-45.*

Becker, A., "Kalman Filter in One Dimension", 2018, <"https://www.kalmanfilter.net/kalman1d.html">.*

Zhu, Z., "The Application of Kalman Filter in Boiler Temperature Monitoring System", 2015, Journal of Applied Science and Engineering Innovation, vol. 2 No. 10, pp. 393-396.*

Akhlaghi, Shahrokh et al. (2017). Adaptive Adustment of Noise Covariance in Kalman Filter for Dynamic State Estimation. IEEE Power & Energy Society General Meeting.

Vdovin, Alexey. (2010). Cooling performance simulations in GT-Suite. Chalmers University of Technology Department of Applied Mechanics—Master's Thesis Automotive Engineering.

* cited by examiner

METHOD AND SYSTEM FOR DETERMINING THERMAL STATE

TECHNICAL FIELD

The present disclosure generally relates to thermal systems and more particularly relates to model-based virtual sensing of propulsion system thermal states for improved control of the combustion process.

BACKGROUND

In system control, the ability to make determinations is subject to limitations, for example because available inputs are less than perfect. When the preferred granularity is not achievable, determinations may result in control levels that are less than optimal. This may result because the measurement of parameters is subject to a number of limitations such as sensors offer varying degrees of accuracy. Also, in some applications parameter states are not practically measured. In some situations, it is not cost effective to obtain measurements, and in other situations sensors may not be practically positioned at an optimal location of interest for the applicable control scheme.

In applications involving internal combustion engines, coolant temperature sensors are typically available for providing inputs usable in making control determinations. However, the activity being controlled includes combustion within the cylinders of the engine. Coolant temperature only indirectly indicates the thermal conditions encountered by the combustion process taking place within the cylinder. The temperatures within the cylinder rapidly vary during a combustion cycle, which involves ambient air and fuel being drawn into the cylinder followed by compression, combustion and exhaust of the air/fuel mixture. Temperatures of the engine block and head mass defining the combustion chamber are typically not directly known. However, those temperatures have a greater influence on the combustion reaction than the temperature of the coolant in the cooling system. For example, in achieving the desired control response when engine operational changes such as cold start and changes between combustion modes are indicated, cylinder temperature is a significant factor. When determining the proportions and amounts of air and fuel delivery, ignition timing and other factors for optimal efficiency, more pertinent information would be useful.

Accordingly, it is desirable to provide methods and systems for determining more useful information when making control determinations. For example, improved temperature information for use in control of an internal combustion engine is desirable. Furthermore, other desirable features and characteristics of the present invention will become apparent from the subsequent detailed description and the appended claims, taken in conjunction with the accompanying drawings and the foregoing technical field and background.

SUMMARY

A number of embodiments include systems and methods for determining a temperature of a thermal system that includes fluid conduits. A system for determining temperature includes a sensor disposed to monitor a current state of a parameter of the thermal system. A controller is configured to: receive, from the sensor, a signal representative of the current state; determine a flow in the fluid conduits; determine a noise covariance of the thermal system; process a thermal model of the thermal system; predict a next-step state of the parameter at a time after the current state; and correct the next-step state based, at least in-part, on the noise covariance resulting in a corrected next-step state.

In additional embodiments, the controller is further configured to control operation of an internal combustion engine based on the corrected next-step state.

In additional embodiments, the sensor is configured to monitor a coolant temperature of a coolant in the fluid conduits. The controller is configured to determine, using the coolant temperature, a wall temperature of the internal combustion engine.

In additional embodiments, at least one valve configured to control the flow through branches of the fluid conduits. The controller is configured to determine, based on a position of the valve, the flow in the branches.

In additional embodiments, the controller is configured to correct the predicted next-step state using a Kalman filter approach.

In additional embodiments, the thermal system includes a cooling system for the propulsion system. The controller is configured to predict the next-step state based on system inputs representing an operational state of the propulsion system at time k−1, and using a nonlinear model. This corrects the predicted next-step state using a measurement of the current state sampled at time k.

In additional embodiments, the controller is configured to determine a reliability of the sensor and to correct the predicted next-step state factoring in the reliability.

In additional embodiments, the controller is configured to determine whether the sensor is unreliable, and when the sensor is unreliable, to predict the next-step state without use of the current state.

In additional embodiments, an actuator configured to control the flow. The controller is configured to determine the flow by an estimate based on a flow model and feedback from the actuator.

In additional embodiments, the controller is configured to correct the next-step state by a Kalman filter observer using temperature measurements, the predicted next-step state, linearized model parameters, and the noise covariance, resulting in the corrected next-step state.

In a number of additional embodiments, a method of determining states of a parameter of a thermal system includes estimating, by a controller and based on a flow model and actuator feedback, branch flows in the thermal system. The controller determines a noise covariance level for a sensor in the thermal system using the estimated branch flows. The controller processes a thermal model and predicts, based on the thermal model, a next-step state of the parameter of the thermal system. The controller corrects the next-step state based, at least in-part, on the noise covariance. The controller operates at least one actuator based on the corrected next-step state.

In additional embodiments, the controller determines the corrected next-step state based on a Kalman filter observer, temperature measurements, the predicted next-step state, linearized model parameters, and the noise covariance.

In additional embodiments, the controller operates an internal combustion engine based on the corrected next-step state.

In additional embodiments the sensor monitors a coolant temperature of a coolant in the fluid conduits. Using the coolant temperature, the controller determines a wall temperature of a wall surrounding a cylinder of an internal combustion engine.

In additional embodiments, a valve controls the flow through branches of the fluid conduits. Based on a position of the valve, the controller determines the flow in the branches.

In additional embodiments, the controller predicts the next-step state using system inputs representing an operational state of a propulsion system at time k−1 and a nonlinear model of the thermal system. The next-step state is corrected using a measurement of a current state sampled at time k.

In additional embodiments, the controller determines whether the sensor is unreliable. When the sensor is determined unreliable, the next-step state is predicted without factoring in the current state.

In additional embodiments, an actuator controls the flow. The controller determines a rate of the flow based on a flow model and feedback from the actuator. The predicted next-step state is predicted by the controller processing a Kalman filter observer using temperature measurements, the next-step state prediction, linearized model parameters, and the noise covariance.

In a number of additional embodiments, a method of determining a next-step state of a temperature of a thermal system of a propulsion system includes monitoring, by a sensor, a current state temperature of the thermal system. The controller estimates, based on a flow model and actuator feedback, branch flows in the thermal system. The controller determines, using the estimated branch flows, a reliability of the sensor, and based on the determined reliability assigns a noise covariance level to the sensor. Based on a thermal model, a next-step state of the temperature is predicted. The controller corrects the next-step state based, at least in-part, on the noise covariance. The controller operates at least one actuator based on the corrected next-step state of the temperature.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
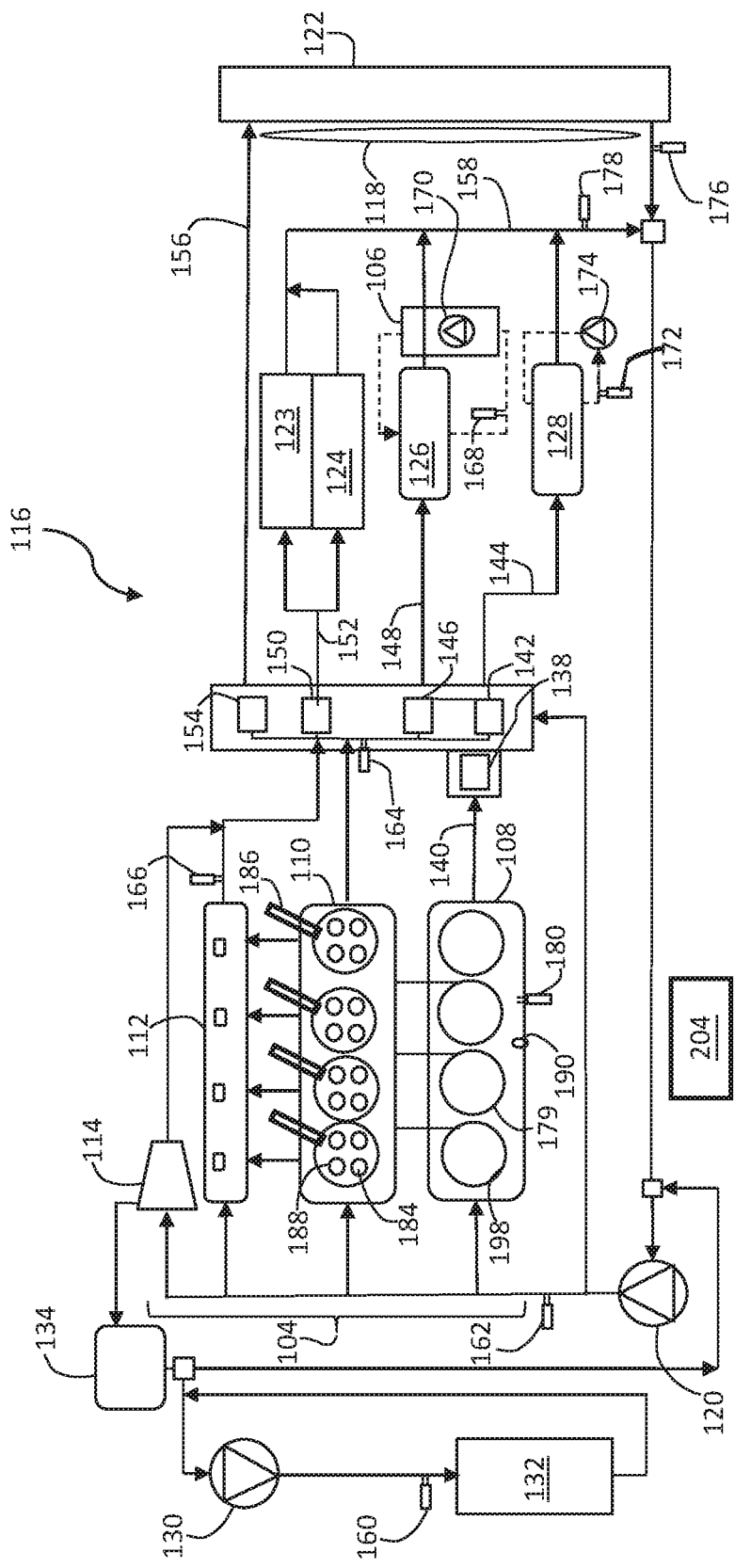
FIG. 1 is a schematic diagram of a thermal system of a vehicle propulsion system with a system for determining thermal states, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As described herein, disclosed systems and methods use a thermal system model and coolant flow with an intelligently configured observer to virtually and reliably sense key temperatures for enhanced thermal management at minimum component cost. In a number of embodiments, methods for determining a thermal state include estimating system branch flow based on a flow model and actuator feedback. The branch flows may be used to determine whether system temperature sensors are reliable. The methods may assign a noise covariance level to each sensor as a reflection of weighted reliability. A thermal model may be used to provide state prediction and to identify linearized model parameters. A Kalman filter observer leveraging temperature measurements, state prediction, linearized model parameters, and noise covariance may be used to estimate the thermal states. The results provide robust temperature estimations over all propulsion system operating conditions, including when there is little or no cooling system flow, providing operational and fuel economy benefits.

With reference to FIG. 1, illustrated is one example of a thermal system 100 for heat management of a propulsion system 102. As will be discussed further herein, the propulsion system is controlled with improved performance and efficiency. The thermal system 100 is but one example of the systems for which improved thermal state information is useful. The disclosed methods are useful in the exemplary applications described herein, because they provide information that was previously unavailable or available only through complex means at an excessive cost. The current disclosure is applicable to other applications where improved performance and more effective control are desirable. Therefore, although described in the vehicle propulsion system context, various features and characteristics disclosed herein may be used in other contexts and applications where additional parameter state information is useful. For example, various other mechanical and electro-mechanical system environments, as well as different types of controlled systems will benefit from the features described herein. Thus, no particular feature or characteristic is constrained to a vehicle or to a propulsion system, and the principles are equally embodied in other thermal management systems, and in other applications.

As represented in FIG. 1, the propulsion system 102 generally includes an engine 104 and a transmission 106. In general, the engine 104 includes a block 108, a head 110, manifolds of which exhaust manifold 112 is an example, and a turbocharger 114. These components comprise a considerable mass and house the combustion process, resulting in substantial disturbances in the thermal system. It will be understood that in application, the block 108, the head 110, the exhaust manifold 112 and the turbocharger 114 will be assembled into an operational engine 104. In addition, the exhaust manifold 112 may be an integrated exhaust manifold formed as one piece with the head 110. Each of the block 108, the head 110, the exhaust manifold 112 and the turbocharger 114 are cooled components and therefore provide inputs that disturb the thermal system 100. In addition, the temperature of each may be a controlled to obtain desirable operational characteristics, particularly to control combustion.

The thermal system 100 includes a number of fluid conduits 116 indicated as a group, and configured to provide interconnections and to direct and channel fluid flow. The conduits 116 may comprise ducts, tubes, hoses, passageways and other defined channels of various sizes. Flow in any given branch is generally a function of pump operation, valve position and conduit configuration. The thermal system 100 includes a main coolant pump 120, which in the current embodiment is an electrically driven pump. In other embodiments, the pump 120 may be driven by other mechanisms, such as mechanically by the engine 104. The pump 120 circulates coolant fluid through the engine 104, a radiator 122, a pair of heater cores 123, 124, an engine oil heat exchanger 126 and a transmission oil heat exchanger 128. A fan 118 is disposed adjacent the radiator to assist in air flow for heat exchange to the ambient air. The thermal system 100 also includes a charge air cooling pump 130, which circulates fluid through a heat exchanger in the form of a charge air cooler 132. A surge tank 134 may be included to accommodate thermal expansion and contraction of the fluid in the thermal system 100.

In the current embodiment, a number of valves control the flow of fluid through different branches of the thermal system 100 as defined by the conduits 116. A block valve 138 is disposed in the conduit between the engine block 108 and the radiator 122. The block valve 138 controls the amount of coolant delivered by the pump 120, which circulates through the branch 140 and the engine block 108. The block valve 138 also controls the split of flow through the block 108 versus the other parts of the engine 104. For example, as the block valve 138 is moved in a closing direction, more coolant is directed to the head 110, exhaust manifold 112 and turbocharger 114 and less through the block 108. In some embodiments, valves may be included to individually control flow through the head 110 and the exhaust system components 112, 114. An additional valve 142 is disposed in a branch 144 that contains the transmission oil heat exchanger 128, a valve 146 is disposed in a branch 148 that contains the engine oil heat exchanger 126, and a valve 150 is disposed in a branch 152 that contains the heater cores 123, 124. A radiator valve 154 controls flow through a branch 156 and as a result determines how much radiator cooled flow is provided as opposed to return flow for recirculation through the branch 158.

Each of the charge air cooler 132, the engine 104, the heater cores 123, 124, the oil heat exchangers 126, 128 and the radiator 122 create disturbances in the thermal system 100, acting as sources of significant temperature changes to the coolant. A number of temperature sensors are included to monitor the coolant temperature at various locations to provide useful information in controlling the propulsion system 102. A charge air inlet sensor 160 is disposed in the conduit near the inlet to the charge air cooler 132. Readings from the sensor 160 may be used to determine the amount of flow delivered through the charge air cooler 132 by the pump 130, to supply the amount of cooling that is needed to cool engine intake air after it passes through the turbocharger 114 and before it enters the engine 104. Incoming air temperature has an effect on engine power and fuel economy and so may be controlled using the charge air cooler 132 for preferred operating results. An engine-in sensor 162 is disposed to monitor coolant temperature prior to entering the engine 104, and an engine-out sensor 164 is disposed to monitor coolant temperature after exiting the engine 104. A head sensor 166 is disposed to monitor coolant temperature after exiting the head 110 and exhaust manifold 112, which in the current embodiment is combined in an integrated casting. An engine oil sensor 168 monitors temperature of the engine oil as circulated by an engine oil pump 170 and a transmission oil sensor 172 monitors temperature of the transmission oil as circulated by a transmission oil pump 174. A radiator sensor 176 monitors the temperature of coolant leaving the radiator 122, a return sensor 178 monitors the temperature of the coolant recirculated through the branch 158, and a block coolant sensor 180 monitors temperature of the coolant in the engine block 108.

The engine 104 includes a number of cylinders 179, each of which is associated with intake valves 184 for supplying air, an injector 186 for supplying fuel and exhaust valves 188 for evacuation of the cylinder 179 following combustion. The combustion air supplied through the intake valves 184 is compressed by the turbocharger 114. Compression causes the combustion air to become heated. Accordingly, the compressed, heated combustion air may be cooled in the charge air cooler 132 before passing to the cylinder 179. Components typically included but not shown, include an exhaust system and various other valves, sensors, and the like that may be provided for operating the exhaust system including for exhaust gas recirculation. The valves 184, 188 may be actuated by cam shafts (not shown) rotating in time with a crankshaft (also not shown). In some examples, a cam phaser (not shown) may selectively vary the timing between the camshaft and the crankshaft.

Figure 2:
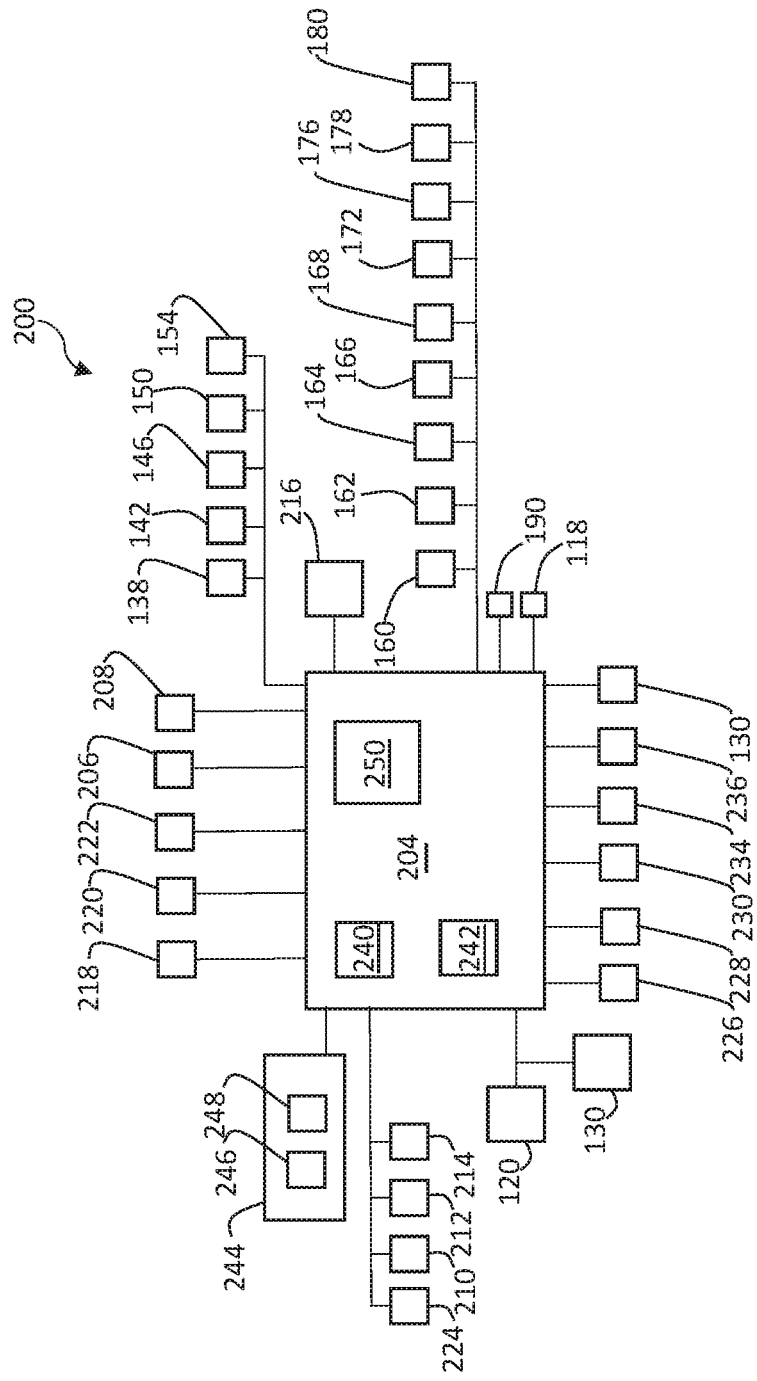
FIG. 2 is a schematic diagram of a control system for the propulsion system of FIG. 2, in accordance with various embodiments.

Referring to FIG. 2, the propulsion system 102 may further include an engine management system 200 including a controller 204 in communication with a number of sensors and/or devices associated with various automotive system components. Generally, the controller 204 is configured to receive inputs from various sensors configured to generate signals in proportion to various physical parameters associated with the engine 104, its subsystems and interrelated systems. The current disclosure provides systems and methods to accurately predict next-step states of various parameters one step into the future for use in accurately controlling the propulsion system 102.

In the current embodiment, the various sensors include, but are not limited to, a mass airflow and temperature sensor 206, a manifold pressure and temperature sensor 208, a combustion pressure sensor 210, a fuel rail pressure sensor 212, a cam position sensor 214, a crank position/rotational speed sensor 216, exhaust pressure sensors 218, an exhaust temperature sensor 220, NOx sensors 222, and an accelerator pedal position sensor 224. The controller 204 generates output signals delivered to various controlled devices/actuators that are arranged to control the operation of the propulsion system 102, including, but not limited to, fuel injectors 226, a throttle valve 228, an EGR valve 230, an VGT actuator 232, and cam phasers 236. Additional output signals may be generated by the controller 204, for example, additional output signals may be associated with the thermal system 100. In some embodiments, a thermal system control module 250 may be implemented by, or in coordination with, the controller 204 to control operation of the thermal system 100 and to provide inputs for use in other operations of the engine 104, such as in controlling fuel and air supplied to the cylinders, ignition timing and other functions. In this context, the controller 204, and/or more specifically the thermal system control module 250, may receive inputs from the temperature sensors, the actuators and other sources. The engine management system 200 also includes the actuators comprising the main coolant pump 120, the charge air cooling pump 130, the fan 118, and the valves 138, 142, 146, 150 and 154. Also included as part of the engine management system 200 are the block heater 190 and the temperature sensors 160, 162, 164, 166, 168, 172, 176, 178 and 180.

The controller 204 may comprise any number of electronic control modules and is configured to receive information from various sources, process that information, and provide control signals/commands based thereon to effect outcomes such as operation of the propulsion system 102 and related systems, including the thermal system 100. In the depicted embodiment, the controller 204 includes a processor 240 and a memory device 242, and is coupled with a storage device 244. The processor 240 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 240 executes one or more programs 246 and may use data 248, each of which may be contained within the storage device 244 and as such, the processor 240 controls the general operation of the controller 204 in executing the processes described herein, such as the processes described further below in connection with FIG. 4.

The memory device 242 may be any type of suitable memory. For example, the memory device 242 may include volatile and nonvolatile storage in read-only memory (ROM), random-access memory (RAM), and keep-alive memory (KAM), for example. KAM may comprise a persistent or non-volatile memory that may be used to store various operating variables while the processor 240 is powered down. The memory device 242 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 204. In certain embodiments, the memory device 242 may be located on and/or co-located on the same computer chip as the processor 240. In the depicted embodiment, the memory device 242 may store the above-referenced programs 246 along with one or more stored values of the data 248 such as for short-term data access.

The storage device 244 stores data, such as for long-term data access for use in automatically controlling the propulsion system 102 and its related systems. The storage device 244 may be any suitable type of storage apparatus, including direct access storage devices such as hard disk drives, flash systems, floppy disk drives and optical disk drives. In one exemplary embodiment, the storage device 244 comprises a source from which the memory device 242 receives the programs that execute one or more embodiments of one or more processes of the present disclosure, such as the steps of the process (and any sub-processes thereof) described further below in connection with FIG. 4. In another exemplary embodiment, the programs 246 may be directly stored in and/or otherwise accessed by the memory device 242. The programs 246 represent executable instructions, used by the electronic controller 204 in processing information and in controlling the propulsion system 102 and its systems, including the engine management system 200. The instructions may include one or more separate programs, each of which comprises an ordered listing of executable instructions for implementing logical functions. The instructions, when executed by the processor 240 support the receipt and processing of signals such as from the various sensors, and the performance of logic, calculations, methods and/or algorithms for automatically controlling the components and systems of the propulsion system 102. The processor 240 may generate control signals for the engine management system 200, and to automatically control various components and systems of the propulsion system 102 and the thermal system 100, based on the logic, calculations, methods, and/or algorithms. As will be appreciated, the data storage device 244 may be part of the controller 204, separate from the controller 204, part of one or more of the controllers, or part of multiple systems. The memory device 242 and the data storage device 244 work together with the processor 240 to access and use the programs 246 and the data 248. While the components of the engine management system 200 are depicted as being part of the same system, it will be appreciated that in certain embodiments, these features may comprise multiple systems. In addition, in various embodiments the engine management system 200 may comprise all or part of, and/or may be coupled to, various other vehicle devices and systems.

The engine management system 200 controls operation of the propulsion system 102 including the thermal system 100 to deliver the desired operational performance including emission management. In general, the controller 204 uses the available inputs, including those from the various sensors and actuators identified above, to provide the engine management system 200 with parameter data to effectively govern various functions of the engine 104. For example, based on the data input, the controller 204 precisely calculates and controls delivery of the appropriate air-fuel mixture and exhaust gas recirculation through operation of the fuel injectors 226, throttle valve 228, EGR valve 230, cam phaser 236 and VGT actuator 234, and may control other parameters such as spark timing. The engine management system 200 also controls the pumps 120, 130 to deliver the appropriate amount of fluid flow through the various branches of the thermal system 100. To schedule control of combustion within the individual cylinders 179, the conditions, including temperature, where the combustion will occur are pertinent. In-cylinder combustion creates significant disturbances in the thermal system 100, and the combustion process is impacted by temperatures When relying on temperature sensor readings, for the extremely dynamic disturbances to be accurately reflected in the information provided to the controller 204, heat must transfer to the coolant to be sensed by the various coolant temperature sensors in the system. A temperature that has a significant influence over the combustion in the individual cylinders 179 is the wall temperature $T_{wall}$ at the block wall 198 of the respective cylinder within which combustion occurs. Using $T_{wall}$ to make control decision provides improved information because it avoids delays while combustion and other disturbance heat transfers to the coolant at locations where measurements occur. However, measuring $T_{wall}$ directly is generally not be practical. Other control functions may also be best effected using a temperature at a location other than where a temperature sensor is placed. In addition, a temperature sensor may be unreliable for a variety of reasons and therefore, the sensed temperature may not be the best indicator in making control determinations. For example, a lack of coolant flow in a branch of the thermal system 100 where a sensor is located may render the sensor data unreliable for an indicated control action due to an excessive time lag in heat transfer to the coolant at the sensor. Accordingly, to carry out control determinations, as disclosed herein, a form of virtual temperature sensing is effected by the engine management system 200.

Figure 3:
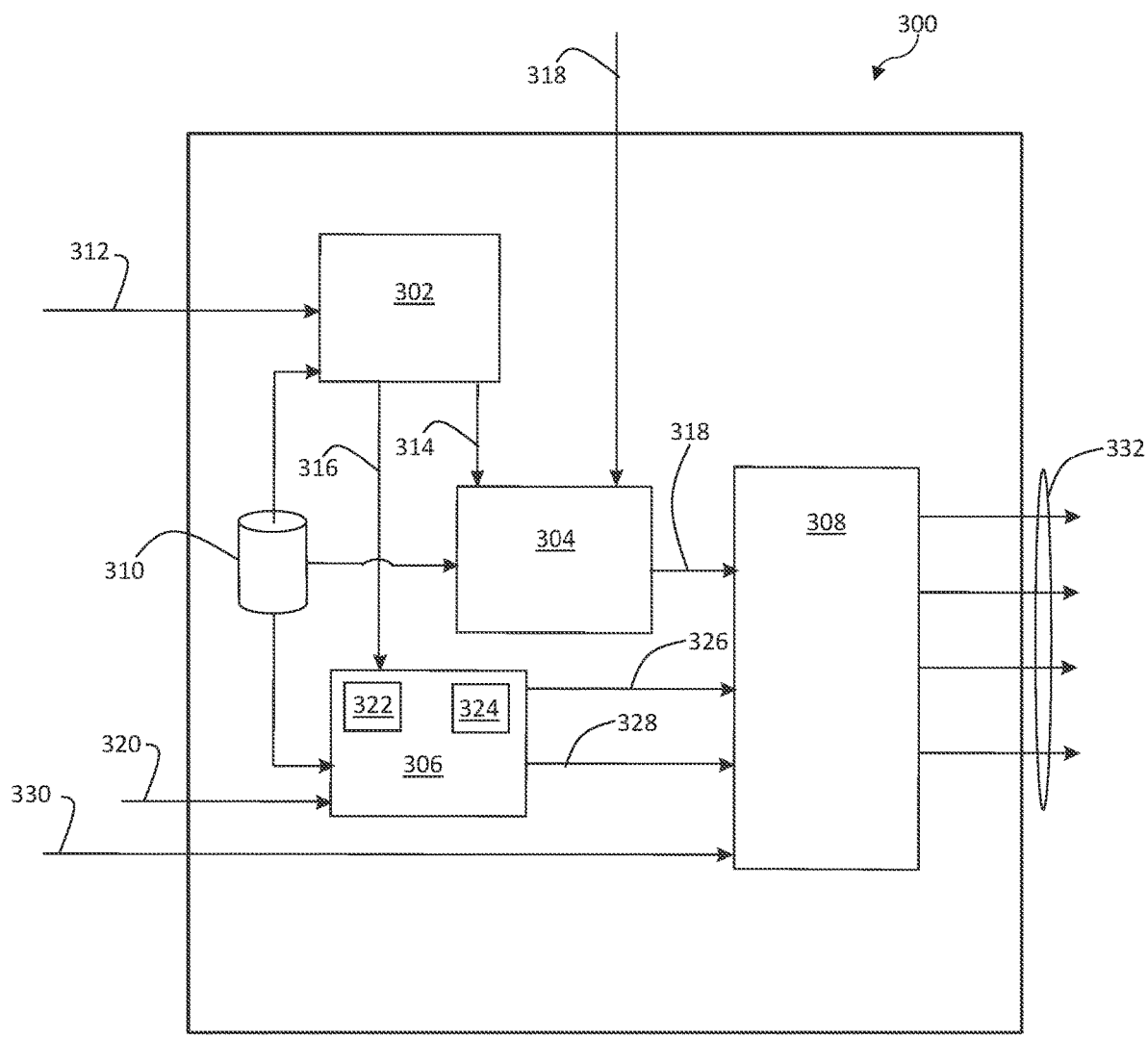
FIG. 3 is a functional block diagram of the system for determining thermal states of FIG. 1, in accordance with various embodiments.
Figure 4:
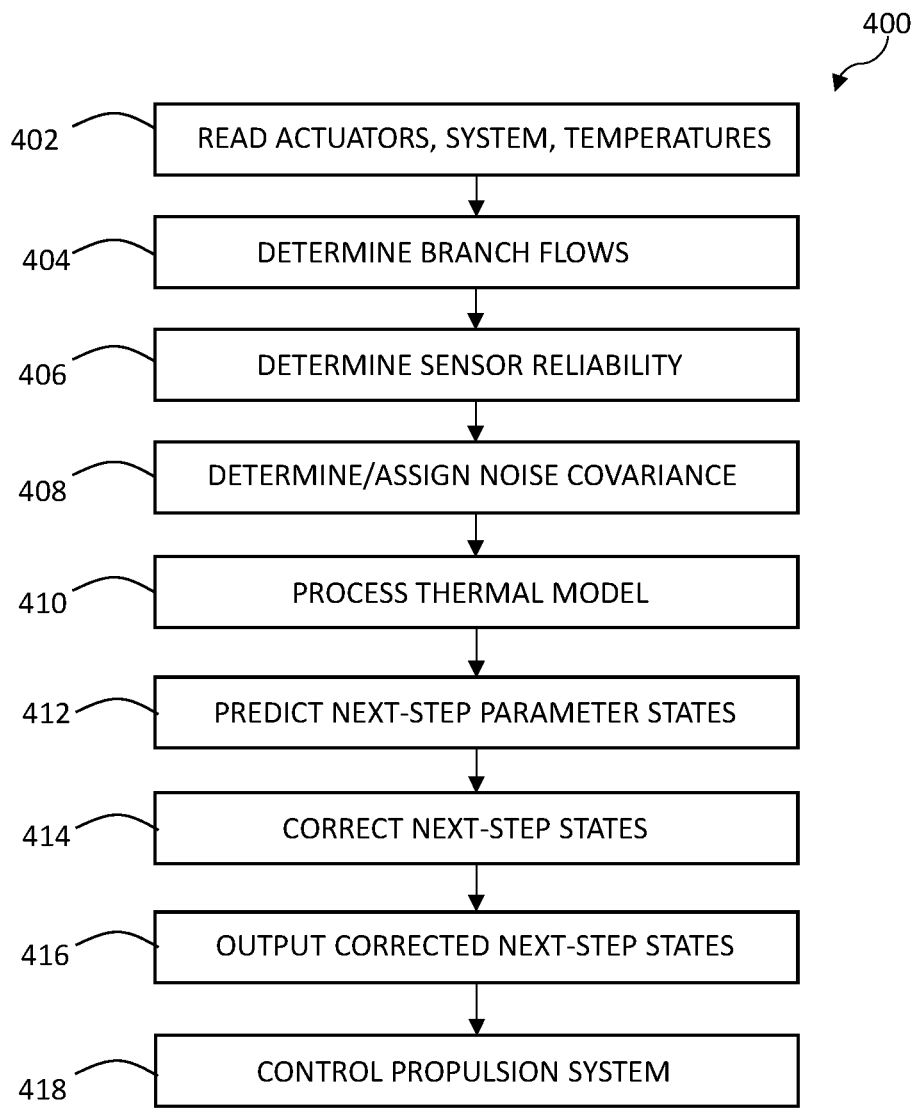
FIG. 4 is a flowchart illustrating a process for determining thermal states that may be performed using the system of FIGS. 1 and 2, in accordance with various embodiments.

Referring additionally to FIGS. 3 and 4, the engine management system 200 may include an architecture 300 that may include a number of modules for carrying out a process 400 to provide the controller 204 with optimal temperature information about the propulsion system 102. In various embodiments, the estimation architecture 300 generally includes a branch flow estimator module 302, a sensor reliability module 304, a model and predict module 306, a correction module 308 and a datastore 310. The engine management system 200 may include any number of additional modules to control aspects of the engine 104 independent of, or in coordination with the modules of the architecture 300. For example, the modules (not shown) that schedule the position of the throttle valve 228 may use the outputs of the architecture 300 to determine the appropriate valve position at any given time.

The branch flow estimator module 302 samples/obtains 402 inputs 312 from the actuators including speed of the main coolant pump 120 and positions of the valves 138, 142, 146, 150 and 154. In some embodiments, the branch flow estimator obtains 402 inputs 312 from relevant sensors, such as flow sensors (not shown) that monitor flow conditions. To understand changes in the thermal system 100 for its respective topology, flow conditions in the various branches is determined 404. Based on the layout, features and dimensions of the fluid conduits 116, speed of the main coolant pump 120 and positions of the valves 138, 142, 146, 150 and 154, the flow in each branch is determined. In various embodiments, the branch flows may be calculated using fluid dynamics. In other embodiments, the branch flows may be determined by characteristic testing and stored in the storage device 244 as data 248, such as in lookup tables where flows are correlated to pump speed and valve positions. In additional embodiments, data for defining the branch flows may be determined by modelling of the thermal system 100 using commercially available computational fluid dynamics software. The data and/or algorithms used to carry out the calculations/determinations may be retrieved from the datastore 310 and specifically from the storage device 244. In sum, the branch flows are determined based on actuator state and any relevant sensor inputs that may be available. The determined branch flows are communicated 314, 316 to the sensor reliability module 304 and to the model and predict module 306, respectively.

The sensor reliability module 304 may receive inputs from other modules of the engine management system. For example, in embodiments where the temperature sensors 160, 162, 164, 166, 168, 172, 176, 178, 180 are provided with monitoring and diagnostics capabilities, the sensor reliability module 304 may determine 406 that a sensor is unreliable when the diagnostic results communicate that a sensor has a fault and a high noise covariance (indicating high noise), is assigned by the controller 204. When a high noise covariance is determined or assigned for a sensor, the correction module 308 determines temperature primarily based on modeling and discounts or ignores sensed values. In other conditions, a temperature sensor 160, 162, 164, 166, 168, 172, 176, 178, 180 may be determined 406 as marginally reliable or unreliable due to measured parameters and an appropriate noise covariance is calculated for each sensor based on its measurement reliability to weigh modeling and measurements based on the reliability. For example, when there is no flow in a branch as determined by the branch flow estimator module 302, the sensor reliability module may determine 406 that the sensor in that branch is unreliable. As a specific example, the inputs 312 may inform the branch flow estimator module 302 that the block valve 138 is fully closed, which communicates 314 to the sensor reliability module 304 that there is no flow in branch 140. As such, the coolant at the block coolant temperature sensor 180 will not be moving and cannot effectively indicated disturbances in the thermal system 100 at points other than its specific position and therefore, the sensor is not providing real time updated information. When these conditions occur, the sensor reliability module determines that the block coolant sensor 180 is unreliable and calculates 408 a high noise covariance to discount or ignore the sensed values versus modeled values.

Figure 5:
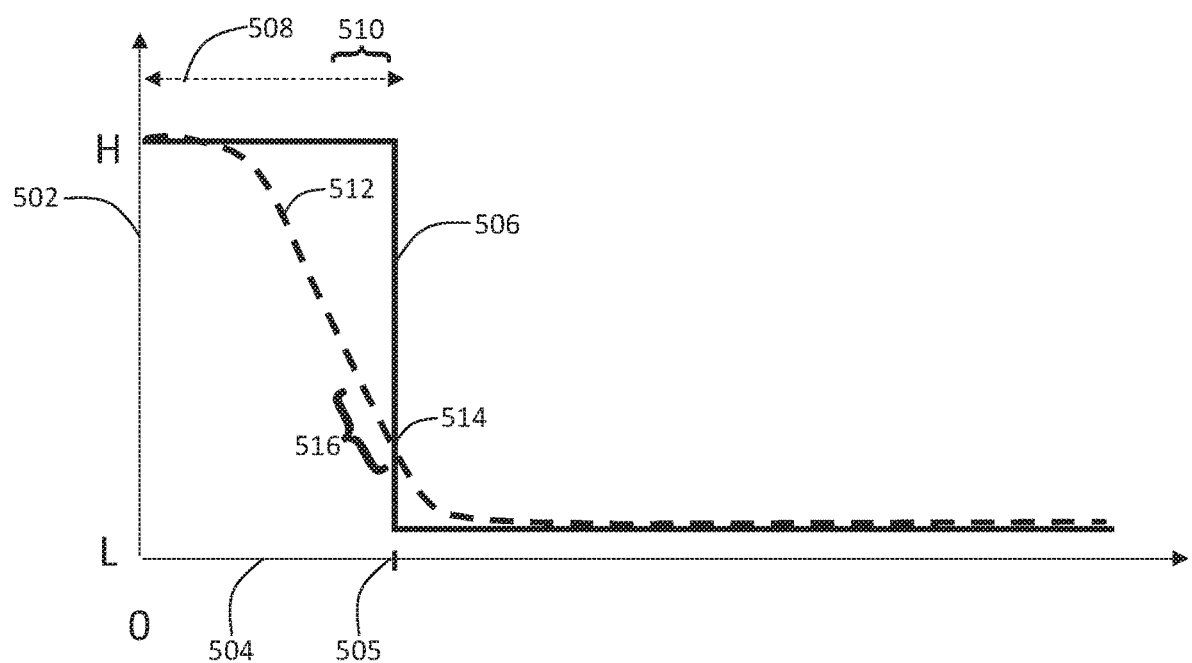
FIG. 5 is a graph of noise covariance versus estimated flow across a sensor demonstrating sensor reliability, in accordance with various embodiments.

Referring additionally to FIG. 5, a graph shows sensor reliability depicting noise covariance on the vertical axis 502 versus flow across the respective sensor on the horizontal axis 504. In general, with low flow a sensor may have a slow response and may be considered less reliable and with high flow a sensor may have a quick response and may be considered more reliable. Through means such as characteristic testing, it may be determined that at and above a minimum flow 505, a sensor is proven reliable. It may also be determined that at low or no flow a sensor becomes unreliable, such as because the sensor is unable to detect the temperature at the point of interest for the controlled parameter. In some embodiments, a sensor may be located precisely at the point of interest and therefore may be reliable even at no flow conditions. Accordingly, that sensor may be determined 406 as reliable even when there is no flow and a low noise covariance may be calculated/assigned 408.

In the current embodiment, flow is used as an indicator of reliability. Noise covariance is assigned/calculated 408 based on the reliability determination 406, and indicates the degree to which the sensor's accuracy is reliable. Curve 506 depicts on/off operation with the sensor reliability module 304 activated intermittently. When flow in the branch containing the sensor is at or near zero in the range 508, the sensor reliability module 304 determines 406 that the sensor is unreliable and calculates 408 a high noise covariance to discount sensed values. When the flow is above the range 508, the sensor reliability module 304 determines 406 the sensor is reliable and calculates 408 a low noise covariance to more heavily weigh sensed values. When the sensor reliability module 304 is activated intermittently, the flow is either within the range 508 when active, or is outside the range 508 when active. In other embodiments, the sensor reliability module 304 may be programmed to consider from more than two outcomes. For example, an intermediate range 510 with flows in the higher portion of the range 508 may be included where the sensor reliability module 304 determines the sensor is marginally reliable and calculates or assigns 408 an intermediate noise covariance.

Curve 512 depicts continuous operation of the sensor reliability module 304. As flow increases, for example as a valve is opened or speed of the coolant pump 120 is increased, flow through the respective conduit 116 increases proportionally. When flow is zero, the accuracy of the respective sensor is determined 406 by the sensor reliability module 304 and a high noise covariance is calculated 408. As flow increases, a point 514 is reached where the flow is above the range 508 and is high enough to accurately and timely reflect disturbances. Under these conditions, the sensor reliability module 304 determines 406 there is high reliability and a low noise covariance is calculated for the sensor based on that flow rate and higher flows. An intermediate zone 516 may be defined where the sensor reliability module 304 determines 406 that the sensor is marginally reliable, and an intermediate noise covariance value is calculated. In other embodiments, any number of zones or points along the curve 512 may be defined that indicate different levels of sensor reliability. The applicable zones may be retrieved, such as from the datastore 310, for comparison to the flows communicated 314 from the branch flow estimator module 302. A greater amount of calibration may be required to accurately reflect the rate of degradation of the reliability that occurs under continuous operation conditions, as opposed to that required for intermittent operation. In some embodiments, the location of a sensor may be used in the noise covariance calculations. For example, if the available sensor is remote from a point of disturbance, a factor may be applied to reduce its reliability to reflect the distance. The sensor reliability module 304 communicates 318 the noise covariance determinations to the correction module 308.

The model and predict module 306 receives propulsion system inputs 320 such as fuel rate to the injectors 226, position of the accelerator pedal 224, position of the EGR valve 230, and other parameters that create disturbances/have an effect on, the thermal system 100. In addition, the model and predict module 306 uses the branch flow estimates as communicated 316 from the branch flow estimator module 302. The model and predict module 306 processes 410 a thermal model of the propulsion system 102 in a model submodule 322. The thermal model may be constructed using commercially available software for constructing physics-based models of thermal systems. The CAD math model of the engine 104 and other components may be used in constructing the model. The model submodule 322 uses the system inputs 320 and may consider a multiple of factors such as ambient temperature, engine on time, the effects of friction, and others. In other embodiments, the model may be constructed using characteristic testing, determining trends and recording results such as in lookup tables. In these embodiments, the model submodule 322 may use the system inputs 320 to determine the corresponding results in the lookup tables. In other embodiments, the thermal model may be constructed using calculations to determine the results from the system inputs 320. The model may be constructed from a combination of approaches and may consider both steady state and transient operation.

The model & predict module 306 processes 410 the system inputs through the thermal model in the model submodule 322 and includes a predict submodule 324, which uses the thermal model results and the branch flow estimations to calculate and predict 412 selected parameters such as $T_{wall}$, engine out coolant temperature $T_{eo}$, integrated exhaust manifold coolant temperature $T_{iem}$, and radiator out coolant temperature $T_{ro}$. Expected thermal state values are predicted 412 into the future, one step ahead of the current state (next-step state), based on the current system inputs 320 and branch flow estimates. The list of parameters is communicated 326 to the correct module 308 and the next-step state predictions are communicated 328 to the correct module 308.

The correct module 308 receives temperature inputs 330 of the current state temperature readings from the temperature sensors 160, 162, 164, 166, 168, 172, 176, 178, 180, along with the list of parameters and the next-step state predictions for those parameters from the model & predict module 306. The correct module 308 also receives the noise covariance determinations communicated 318 from the sensor reliability module 304. The correct module 308 corrects 414 the predicted next-step states based on the current sensed temperatures and the associated noise covariance determinations. The parameters are entered into linear system matrices in a Kalman filter analysis to correct 414 the predicted values. When the noise covariance value is high for a sensor, the sensed temperature input 330 has little or no effect on the outcome, and the prediction from the model and predict module 306 substantially determines the next-step state values for the parameter outputs 332 delivered 416 to the controller 204 and used to control 418 the propulsion system 102.

The prediction and correction functions may be modeled using an extended Kalman filter approach. The functions may be created using the nonlinear model: $\dot{x}=f(x, p, u)$, where x are states representing the various temperatures inside thermal system 100 that are used for controlling the propulsion system 102, p are the system parameters, and u are the current system states (system inputs). There may be a subset of x that are measurable: $y_m = c_m x$ (the matrix c selects which x are measurable). Another subset of x may not be measurable for example, a sensor may not exist at a desired location (e.g. for $T_{wall}$), or a sensor may become inoperable. A number of steps are included in estimating the states x at the sample time $[kT_s]$ (shortened to $\hat{x}[k]$, where k represents time) given the previous estimate at the sample time $(k-1)T_s$ (namely $\hat{x}[k-1]$). One step is to predict 412 at the model and predict module 306, using the nonlinear model given the estimate at time k-1 to obtain $\hat{x}[k|k-1]$. Another step is to correct 414 the predicted state $\hat{x}[k|k-1]$ by using the measurement of $y_m$ sampled at time [k] to obtain $\hat{x}[k|k]$.

Given the current estimate $\hat{x}[k-1|k-1]$ and the current system inputs 320 (u[k-1]), and system parameters p[k-1], the nonlinear model is used to solve for the predicted state at $\hat{x}[k|k-1]$ in the model & predict module 306. Integration methods may be used to perform a solving step. An example method is the simple Euler's method where: $\hat{x}[k|k-1]=\hat{x}[k-1|k-1]+f(\hat{x}[k-1|k-1], p[k-1], u[k-1])T_s$. At the correction module 308, the nonlinear model $\dot{x}=f(x, p, u)$ is linearized and discretized based on the sensed step k-1 values to obtain the discrete linear system form given as:

$$x(k+1)=A(k)x(k)+B(k)u(k)+G(k)w(k);\text{ and}$$

$$y_m(k)=Cm(k)x(k)+z(k)$$

where A, B, C and G are matrices and w and z are noise.

For correction, Q and R are used as the covariance matrices for the process noise w and measurement noise z respectively. P is an estimation error covariance matrix. The following equations correct the predicted states to obtain the final next-step state values of x[k|k]:

$$e(k)=y_m(k)-\hat{y}_m(k|k-1);$$

$$M(k)=P(k|k-1)C_m(k)'(C_m(k)P(k|k-1)C_m(k)'+R(k))^{-1};$$

$$\hat{x}(k|k)=\hat{x}(k|k-11)+M(k)e(k);\text{ and}$$

$$P(k|k)=(I-M(k)C_m(k))P(k|k-1).$$

Where:
e is error between the prediction and the actual measurements, and is used to correct the state predictions;
M is Kalman filter correction feedback gain;
M*e is a quantity that corrects the state prediction to get the corrected state estimates;
P is an estimation covariance matrix;
C is a matrix that relates the system state (x) to system output (y);
R is measurement error covariance matrix that characterizes how "noisy" the measurements are; and
I is an identity matrix where all elements are zero and only the diagonal elements are 1.

The next-step state values are used for purposes of controlling the propulsion system 102. For example, the next step $T_{wall}$ value may be used to control combustion by controlling the actuators of the fuel injectors 226, throttle valve 228, EGR valve 230, VGT actuator 234 and cam phaser 236. Accordingly, temperatures are accurately and reliably determined for enhanced thermal management including at locations where a sensor is not present and for conditions when a sensor is not reliable. In a number of embodiments, methods for determining a thermal state include estimating system branch flow based on a flow model and actuator feedback. The branch flows may be used to determine whether system temperature sensors are reliable. The method may assign a noise covariance level to each sensor as a reliability weight. A thermal model may be used to provide state prediction and linearized model parameters. An observer such as one based on a Kalman filter, along with temperature measurements, state prediction, linearized model parameters, and noise covariance may be used to estimate the thermal states. The results provide robust temperature estimations over all propulsion system operating conditions providing operational and fuel economy benefits.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for determining temperature, comprising:
a thermal system including plural fluid conduits;
a pump disposed in the thermal system;
plural valves disposed in the thermal system;
a sensor disposed to monitor a current state of a parameter of the thermal system; and
a controller configured to:
receive, from the sensor, a signal representative of the current state;
receive from the pump, a speed signal;
receive, from actuators of the plural valves, position signals;
determine, based on the speed signal and the position signals, flows in the plural fluid conduits;
determine a noise covariance of the thermal system;
process a thermal model of the thermal system;
predict, based on the thermal model and the flows in the plural fluid conduits, a next-step state of the parameter at a time after the current state; and
correct the next-step state based, at least in-part, on the noise covariance resulting in a corrected next-step state.

2. The system of claim 1, further comprising an internal combustion engine, wherein the controller is further configured to control operation of an internal combustion engine based on the corrected next-step state including to assign, based on the flows, the noise covariance value to the sensor, and to discount a temperature input provided by the sensor in relation to a reduction in the flows.

3. The system of claim 2, wherein the sensor is configured to monitor a coolant temperature of a coolant in the fluid conduits, and wherein the controller is configured to determine, using the coolant temperature, a wall temperature of the internal combustion engine, where the wall temperature is a cylinder block wall temperature of the internal combustion engine, wherein the controller is configured to control combustion in the internal combustion engine based on the wall temperature.

4. The system of claim 1, wherein the plural valves are configured to control the flow through branches of the fluid conduits, wherein the controller is configured to determine, based on positions of the plural valves, the flow in the branches, wherein the plural valves comprise a block valve controlling coolant flow through an engine, a heater valve controlling flow through a heater core, and a radiator valve controlling flow through a radiator.

5. The system of claim 1, wherein the controller is configured to correct the predicted next-step state using a Kalman filter approach, including by designating a reliability of the sensor based on a position of one of the plural valves, and designating the reliability as unreliable when the one of the plural valves is closed.

6. The system of claim 5, comprising an engine, wherein the controller is configured to predict the next-step state based on inputs representing an operational state of the engine at time k−1, and using a nonlinear model, and to correct the predicted next-step state using a measurement of the current state sampled at time k.

7. The system of claim 5, wherein the controller is configured to designate the reliability as reliable when the one of the plural valves is full open.

8. The system of claim 1, wherein the controller is configured to determine, based on the flows, whether the sensor is unreliable, and when the sensor is unreliable as indicated by the flows, to predict the next-step state without use of the current state.

9. The system of claim 1, wherein the controller is configured to determine, when the flows in the fluid conduits are approximately zero, a temperature in the thermal system using a high noise covariance to discount sensed temperature values.

10. The system of claim 1, wherein the controller is configured to:
receive temperature inputs of current state temperature readings from a plurality of temperature sensors;
calculate next-step state predictions for select parameters;
determine, based on rates of the flows, the noise covariance;
correct the next-step state predictions based on the current state temperature readings and the noise covariance determination.

11. A method of determining states of a parameter, the method comprising:
receiving, by the controller, a position signal for each of plural valves and a speed signal for a pump, wherein the pump and the plural valves are connected in a network of fluid conduits;
estimating, by a controller and based on a flow model of the network of fluid conduits and actuator feedback for the position signals of each of the plural valves, branch flows in the network of fluid conduits;
determining, by the controller using the estimated branch flows, a noise covariance level for a sensor in the network of fluid conduits;
processing, by the controller, a thermal model;
predicting, by the controller and based on the thermal model and the branch flows, a next-step state of the parameter; and
correcting, by the controller, the next-step state based, at least in-part, on the noise covariance; and
operating, by the controller, at least one actuator based on the corrected next-step state.

12. The method of claim 11, comprising:
designating a reliability of the sensor based on a position of one of the plural valves;
designating the reliability as unreliable when the one of the plural valves is closed; and
determining the corrected next-step state by the controller and based on a Kalman filter observer, temperature measurements, the predicted next-step state, linearized model parameters, and the noise covariance.

13. The method of claim 11, comprising:
assigning, based on the branch flows, the noise covariance value to the sensor;
discounting a temperature input provided by the sensor in relation to a reduction in the flows; and
controlling, by the controller, operation of an internal combustion engine based on the corrected next-step state.

14. The method of claim 11, comprising:
monitoring, by the sensor, a coolant temperature of a coolant in the fluid conduits, and
determining, by the controller and using the coolant temperature, a wall temperature of a wall surrounding a cylinder of an internal combustion engine; and
controlling combustion the internal combustion engine based on the wall temperature.

15. The method of claim 11, comprising:
controlling, by the plural valves, the branch flows in the network of fluid conduits; and
determining, by the controller and based on positions of the plural valves, the flow in the branches.

16. The method of claim 11, wherein predicting the next-step state comprises using inputs representing an operational state of an engine at time k−1 and a nonlinear thermal system model, and
wherein correcting the next-step state comprises using a measurement of a current state sampled at time k.

17. The method of claim 11, comprising:
determining, by the controller and based on a flow rate of the branch flows, whether the sensor is unreliable, and
predicting, when the sensor is determined unreliable as indicated by the flow rate, the next-step state without factoring in the current state.

18. The method of claim 17, comprising:
determining, when a flow rate in the network of fluid conduits is approximately zero, a temperature using a high noise covariance to discount a temperature value received from a sensor.

19. The method of claim 11, comprising:
correcting the predicted next-step state by the controller processing a Kalman filter observer using temperature measurements, the next-step state prediction, linearized model parameters, and the noise covariance.

20. A method of determining a next-step state of a temperature for control of an engine, the method comprising:
monitoring, by a sensor, a current state temperature;
estimating, by a controller and based on a flow model and actuator feedback, branch flows in a network of cooling conduits connected with the engine;
determining, by the controller and based on the estimated branch flows, a reliability of the sensor, wherein the reliability is related to a flow rate across the sensor;
assigning, by the controller and based on the determined reliability, a noise covariance level to the sensor;
processing, by the controller, a thermal model;
predicting, by the controller and based on the thermal model and on the estimated branch flows, a next-step state of the temperature; and
correcting, by the controller, the next-step state based, at least in-part, based on the noise covariance; and
operating, by the controller, at least one actuator of the engine based on the corrected next-step state of the temperature.

* * * * *